Oct. 17, 1967   G. DREYFUS ET AL   3,347,605
FLUID BEARING

Filed Sept. 28, 1965   3 Sheets-Sheet 1

United States Patent Office 3,347,605
Patented Oct. 17, 1967

3,347,605
FLUID BEARING
Gaspard Dreyfus, Fresnes, and Marcel Pierre Le Nabour, Maisons Laffitte, France, assignors to Commissariat à l'Energie Atomique, Paris, France
Filed Sept. 28, 1965, Ser. No. 490,809
Claims priority, application France, Oct. 6, 1964, 990,416
2 Claims. (Cl. 308—122)

ABSTRACT OF THE DISCLOSURE

A bearing housing has apertures disposed at intervals in four rows forming a rectangle resulting in a small tolerance between the housing and shaft. The rectangle so formed is surrounded by successive expansion chambers providing a barrier to reduce the flow of fluid escaping through the clearance between the shaft and the bearing.

---

This invention relates to an improvement made in fluid bearings for rotating machines, especially with a view to permitting of satisfactory operation which is practically free from vibrations, as well as low pressures for the supply of fluid and relatively substantial clearances between the bearing housing and the rotary shaft.

It is in fact known that one of the essential conditions of good operation of fluid bearings of the type at present known lies in the use of fairly high supply pressures and small clearances. With this object in view, the housing of a bearing of this type is usually provided with blowing slots which serve to inject the fluid at the desired rate of flow and pressure. However, in this case, it is known that the pressure maintained within the cavity which is formed between the rotary shaft, the blowing slots and the bearing housing proper is a decreasing function of the radial clearance usually provided between said shaft and the bearing. The static equilibrium of said bearing is in that case indifferent with respect to said volume whereas in the dynamic state and at certain speeds of rotation, there appear on the other hand substantial vibrations which depend directly on said volume.

The present invention is concerned with a particular arrangement for fluid bearings which make it possible to circumvent the disadvantages referred-to above by virtue of a very simple design which improves the stability and "rigidity" of the bearing.

To this end, a bearing in accordance with the invention is characterized in that the bearing housing is provided with apertures arranged at intervals in four rows forming a rectangle so that any cavity between the housing and the rotary shaft is virtually eliminated to within a small tolerance.

The invention also consists in surrounding the rectangle thus formed by successive expansion chambers constituting a barrier which is intended to reduce the flow of fluid escaping through the clearance between the shaft and the bearing and the efficiency of which varies with said clearance.

The diagrammatic figures which are given in the accompanying drawings clearly show the manner in which this arrangement can be carried into practice through one particular example of embodiment, it being understood that said example is given by way of indication and not in any limiting sense.

Figure 2:
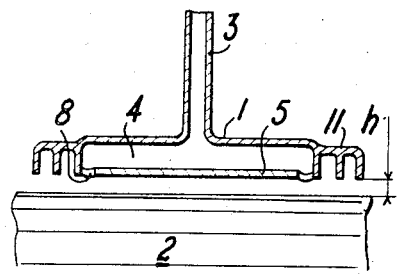
Figure 1:
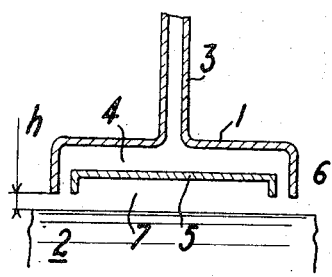
Figure 6:
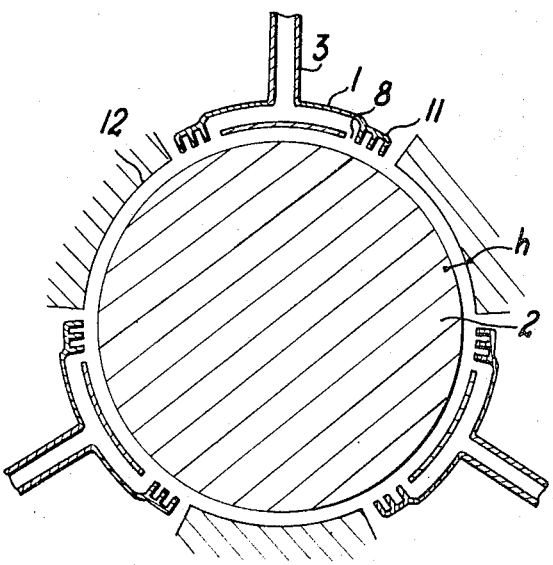
Figure 4:
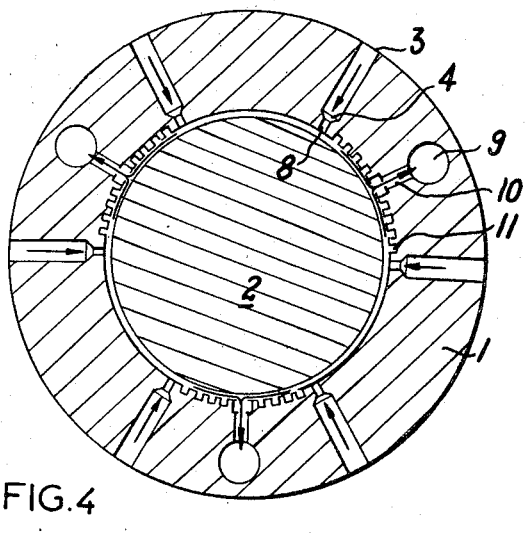
Figure 3:
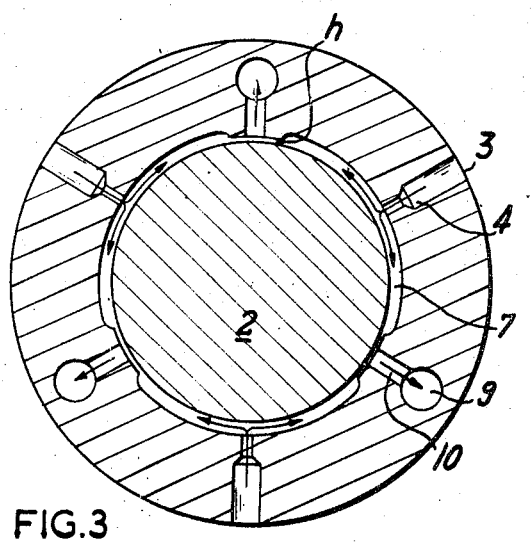
Figure 5:
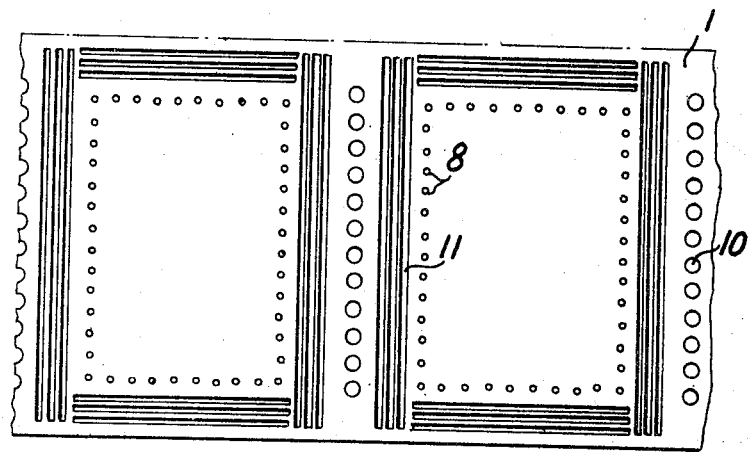

In these drawings:

FIGS. 1 and 2 are partial axial cross-sections of fluid bearings provided respectively with blowing slots in accordance with an arrangement which is already known and apertures formed in the bearing housing in accordance with the essential characteristics of the invention, FIGS. 3 and 4 are transverse sectional views of fluid bearings constructed in accordance with the diagrams of FIGS. 1 and 2 respectively, FIG. 5 is a developed view of FIG. 4, FIG. 6 is another sectional view of a fluid bearing as constructed in accordance with the invention and endowed with an additional improvement which makes it possible above all to improve the damping action of said bearing.

In the description which now follows, the term "unitary bearing" will serve to designate a portion of the bearing which is limited by the rectangle formed by rows of injection apertures.

The unitary bearing which is illustrated in FIG. 1 in a developed view comprises a housing 1 which surrounds at least partially a rotary shaft 2, said housing being provided with an inlet pipe 3 for admitting a suitable fluid to a chamber 4 formed between the housing 1 and a central plate 5 which surrounds the shaft 2. In accordance with a conventional arrangement, the fluid which is admitted within the chamber 4 passes out of this latter through blowing slots such as the slot 6 which permit the admission of said fluid between the shaft and the plate 5 with sufficient pressure to support said shaft without friction during the rotational motion thereof. In a bearing of this type, the pressure maintained within the cavity 7 which is formed between the shaft 2 and the plate 5 is an increasing function of the reciprocal of the distance $h$ or radial clearance formed between the rotary shaft and the radial extremities of the blowing slots. As has already been stated, it is known as a result of experience that a bearing of this type is characterized by its total indifference with respect to the volume of the cavity 7 so far as concerns the static equilibrium of the shaft; on the other hand, said volume gives rise to the appearance of vibrations of the rotating shaft 2 and even contributes to the maintenance of such vibrations.

The arrangement shown in FIG. 2 makes it possible in accordance with the invention to avoid the disadvantage referred-to. To this end, the housing of the bearing 1 and the central plate 5 again form a chamber 4 for the admission of fluid whilst the cavity 7 of FIG. 1 is eliminated, allowance being nevertheless made for the clearance $h$ between the bearing and the rotary shaft. This arrangement therefore consists in virtually suppressing the blowing slots 6 and in replacing them by apertures 8 which are formed in the plate 5, the volume comprised between said apertures and the rotary shaft being accordingly equal to the value $hS$ in which S is the surface area of the unitary bearing as limited by the injection apertures. The annular distribution of the fluid around the shaft 2 is obtained by means of a suitable spacing of the holes 8 formed in the plate 5 along the perimeter of a rectangle as indicated in FIG. 5 (which is a developed view of the bearing of FIG. 4) in order to increase the rigidity of the bearing.

Another important feature of a fluid bearing, in addition to its damping action which ensures satisfactory operation at all speeds, lies in its "rigidity," that is to say in the maximum value of the derivative of the restoring force applied to the rotary shaft relative to the eccentric displacement of this latter.

In accordance with FIGS. 2 and 4, each element of the bearing is provided, at each end adjacent to the apertures 8 for the injection of fluid towards the shaft 2, with successive expansion chambers such as the chamber 11 (as shown also in FIG. 6), said chambers constituting as a result of their adjacent arrangement a kind of labyrinth, the efficiency of which varies with the value of the clearance $h$, said efficiency being very high in respect to small clearances and practically zero in respect of high values of said clearances.

FIGS. 3 and 4 illustrate two alternative forms of embodiment which have been devised so as to take into account the arrangements shown respectively in FIGS. 1 and 2. Identical reference numerals have been employed in FIGS. 3 and 4 to designate similar elements. It will be noted that, in both cases, the admission of fluid always takes place through pipes or ducts 3 which open into chambers 4 for the distribution of fluid whilst the fluid is discharged through ducts 9 which are connected by means of the ducts 10 to the space provided between the rotary shaft 2 and the housing of the bearing 1.

A particular arrangement which has the precise object of permitting an improvement in the damping action of a bearing of this type is illustrated in the diagram of FIG. 6. In fact, in the case in which the weight of the rotary shaft to be supported by the unitary bearings is small and in which provision is made only for a small number of unitary bearings, said bearings can advantageously have a limited radial development. With this object in mind, it is an advantage to provide between said unitary bearings around the shaft 2 partitions such as the partition 12 which are disposed at a minimum distance from the shaft which is at least equal to the clearance $h$ of the bearings, said partitions being designed to contribute to the damping of any transverse vibrations which may occur. In fact, in the event of eccentric displacement, of the shaft, the variation in pressure of the fluid contained between the shaft 2 and said partitions 12 tends to reduce the extent of displacement off-center.

As will be readily understood, the invention is not limited to the forms of embodiment which have been described and illustrated and which have been given solely by way of example.

What we claim is:

1. Fluid bearing utilizing low pressures for the supply of fluid and having a substantial clearance between the rotary shaft and the bearing housing, said housing being provided with apertures arranged at intervals in four rows forming a rectangle whereby any cavity between said housing and said rotary shaft is virtually eliminated to within a small tolerance and said housing being provided with successive expansion chambers for said fluid so as to constitute a labyrinth whose efficiency varies with the value of said clearance.

2. Fluid bearing utilizing low pressures for the supply of fluid and having a substantial clearance between the rotary shaft and bearing housing, said housing being provided with apertures arranged at intervals in four rows forming a rectangle whereby any cavity between said housing and said rotary shaft is virtually eliminated to within a small tolerance, said housing comprising partitions for separating bearing elements and affording with respect to said rotary shaft a clearance which is at least equal to the corresponding clearance of said elements.

References Cited

UNITED STATES PATENTS

| | | |
|---|---|---|
| 2,973,956 | 3/1961 | Hartley. |
| 3,039,830 | 6/1962 | Whitley _____ 308—9 |

EDGAR W. GEOGHEGAN, *Primary Examiner.*

FRANK SUSKO, *Examiner.*